United States Patent [19]

Bustard et al.

[11] 4,230,597

[45] Oct. 28, 1980

[54] CONVERSION OF RADIOACTIVE WASTE MATERIALS INTO SOLID FORM

[75] Inventors: Thomas S. Bustard; Corriene S. Pohl, both of Ellicott City, Md.

[73] Assignee: Hittman Corporation, Columbia, Md.

[21] Appl. No.: 930,524

[22] Filed: Aug. 3, 1978

[51] Int. Cl.$^2$ .............................................. G21F 9/16
[52] U.S. Cl. ........................ 252/301.1 W; 260/29.4 R; 528/259
[58] Field of Search .............................. 252/301.1 D; 260/29.4 R, 849; 528/259

[56] References Cited

U.S. PATENT DOCUMENTS

| | | | |
|---|---|---|---|
| 2,670,341 | 2/1954 | Joffe | 260/29.4 R |
| 2,872,425 | 2/1959 | Paz | 528/259 |
| 3,026,277 | 3/1962 | Gerko | 260/29.4 R |
| 3,463,738 | 8/1969 | Fitzgerald et al. | 252/301.1 W |
| 3,837,872 | 9/1974 | Conner | 106/74 |
| 3,988,258 | 10/1976 | Curtiss | 252/301.1 L |
| 4,010,108 | 3/1977 | Gablin et al. | 252/301.1 W |

FOREIGN PATENT DOCUMENTS 1246848 10/1960 France .............................. 252/301.1 W

OTHER PUBLICATIONS

Colombo et al., "Properties of Radioactive Wastes and Waste Containers", BNL-NUREG-50571 (Oct. 1976), pp. 31-33.
Kibbey et al., "A Critical Review of Solid Radioactive Waste Practices at Nuclear Power Plants", ORNL-4924 (Mar. 1974), pp. 2, 4, 8-10, 24, 25, 27.
"Radwaste Solidification System (Polymer)", Report No. HN-R1113, Revision O (Feb. 1976), Hittman Nuclear & Development Corp., Columbia, Md., pp. I-1, II-2 to II-6, III-3, III-4 and IV-4.

Primary Examiner—Benjamin R. Padgett
Assistant Examiner—Deborah L. Kyle
Attorney, Agent, or Firm—Fleit & Jacobson

[57] ABSTRACT

Radioactive waste materials are converted into solid form by mixing the radioactive waste with a novel polymeric formulation which, when solidified, forms a solid, substantially rigid matrix that contains and entraps the radioactive waste. The polymeric formulation comprises, in certain significant proportions by weight, urea-formaldehyde; methylated urea-formaldehyde; urea and a plasticizer. A defoaming agent may also be incorporated into the polymeric composition. In the practice of the invention, radioactive waste, in the form of a liquid or slurry, is mixed with the polymeric formulation, with this mixture then being treated with an acidic catalyzing agent, such as sulfuric acid. This mixture is then preferably passed to a disposable container so that, upon solidification, the radioactive waste, entrapped within the matrix formed by the polymeric formulation, may be safely and effectively stored or disposed of.

13 Claims, 1 Drawing Figure

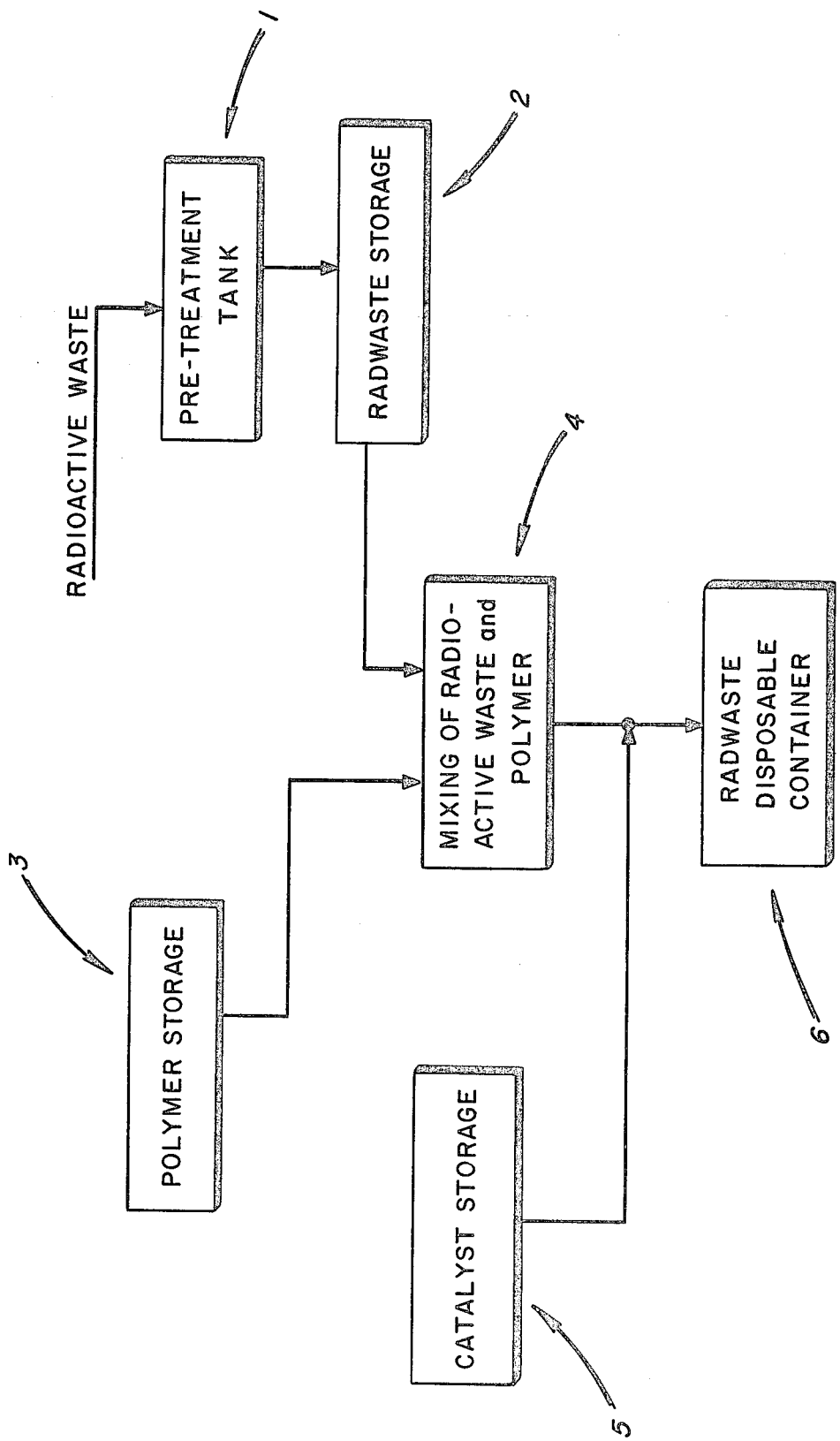

CONVERSION OF RADIOACTIVE WASTE MATERIALS INTO SOLID FORM

BACKGROUND OF THE INVENTION

1. Field of the Invention

The present invention relates to radioactive waste materials and, more particularly, to a unique polymeric formulation for converting radioactive waste into a solid, free-standing mass which may be safely and effectively stored or disposed of.

2. The Prior Art

As is well known in the art, relatively large volumes of radioactive waste materials are produced in nuclear power-producing plants or facilities. Such radioactive waste materials generally comprise liquid mixtures or slurries of spent demineralized resins, evaporator concentrates, filter sludges, neutralized chemical wastes, etc. Specific details as to the sources and kinds of radioactive waste are disclosed, for example, in "*A critical review of solid radioactive waste practices at nuclear power plants*", A. H. Kippey and H. W. Godbee, published in ORNL-4924 (March 1974).

In this regard, known methods for disposing of radioactive waste include storage of the waste in large tanks or vessels and seepage of the liquid waste into suitable geologic formations. Further known techniques involve the use of binding agents, such as cement or polymeric resins, e.g., polyethylene, which serve to form, when solidified, free standing, solid masses which contain the radioactive waste. Examples of known processes which employ the use of cement, as to binding agent for the radioactive waste, are disclosed in French Pat. No. 1,246,848 and U.S. Pat. No. 3,837,872. A specific example of the use of a polymeric binding agent is disclosed in U.S. Pat. No. 3,988,258.

SUMMARY OF THE INVENTION

In summary, the present invention relates to a novel polymeric composition which is designed, and has particular utility for, packaging and solidifying radioactive liquid waste materials. In its broadest aspect, the organic solidification composition of the invention comprises a urea-formaldehyde based polymeric formulation which, when mixed with the radioactive waste and a catalytic curing agent, forms a solid, free-standing matrix which totally encapsulates the radioactive waste. More specifically, although again broadly speaking for the moment, the unique organic composition of the invention comprises urea-formaldehyde; a methylated urea-formaldehyde; urea; a plasticizer (as to be defined hereinbelow) and a defoamer.

In the practice of the invention, the radioactive waste, in the form of a liquid or slurry, is first mixed with the urea-formaldehyde based formulation of the invention. An acidic catalyzing-curing agent is then mixed with the radioactive waste polymeric mixture in a manner, as to be described in more detail hereinafter, to form a solidified mass which contains the radioactive waste fully encapsulated within the matrix formed upon the solidification of the polymeric mixture.

The unique polymeric or solidification agent of the invention is less sensitive to the chemistry or chemical characteristics of the radioactive waste than known solidification materials, has effective-packaging efficiency (as defined hereinafter) and produces a free-standing solid matrix which satisfies the "no free liquid" criteria of the industry. Extensive test data have further established that the product of the invention is particularly suitable for its intended use both in terms of its ease of use and absence of the liquid.

It is accordingly a general object of the present invention to provide a novel organic solidification composition for the disposal of radioactive waste materials.

Yet another object is to provide a process for the disposal of radioactive waste materials by the encapsulation of said waste in a urea-formaldehyde based polymeric solidification agent.

Another object is to provide a very effective process for converting radioactive wastes into a solid, free-standing polymeric mass which may be safely and effectively stored or disposed of.

A still further object is to convert radioactive waste materials into a form which substantially obviates the potential for pollution of the atmosphere or of geologic formations.

A further object is to provide an organic formulation which, when solidified, totally encapsulates radioactive waste materials.

BRIEF DESCRIPTION OF THE DRAWINGS

The above and further objects of the present invention will be better understood in view of the following detailed description and accompanying drawing wherein:

FIG. 1 is a schematic flow diagram illustrating a preferred method embodiment for employing the unique polymeric formulation of the present invention.

DESCRIPTION OF THE PREFERRED EMBODIMENT(S)

As discussed above, the present invention is based on the remarkable development of an urea-formaldehyde based formulation which, when solidified, forms a solid, substantially rigid matrix which effectively contains and entraps radioactive wastes. The solidified mass or matrix, which contains the waste, is physically and chemically stable over a wide range of conditions and can be stored or disposed of either above or below the ground.

Turning now to more specific details of the invention, the radioactive waste-binding composition comprises from between about 30 to 48%, by weight, urea-formaldehyde; from between about 25 to 45%, by weight methylated urea-formaldehyde; from between about 15 to 30%, by weight, urea and from between about 0.1 to 2.5%, by weight, plasticizer. As to be discussed in more detail hereinbelow, a defoaming agent may also be incorporated in the composition to prevent foaming.

Urea-formaldehyde is, of course, a well-known product which is prepared by the condensation reaction of formaldehyde with urea. This product is commercially available with its use in adhesives, in paints, as molding agents and the like being also well known in the art. Generally speaking, it is commercially available both in the solid and liquid forms. In preparing the composition of the invention, it has been found to be particularly advantageous to use an unmodified liquid urea-formaldehyde which contains from between about 60 to 70%, by weight, solids, the balance being water. An example and preferred liquid urea-formaldehyde is that product manufactured and sold under the trademark "URAC 180" by the American Cyanamid Corporation. Methylated urea-formaldehyde is also a known product, this material being also typically employed in paints, varnishes, and the like. In the practice of the invention, it has been found to be particularly advantageous to employ a methylated urea-formaldehyde wherein at least about 60% of the urea-formaldehyde is methylated to the extent that from about 2 to 3(2.4-mean average) of the 4 hydrogen atoms of the formaldehyde group have been replaced with methyl radicals. This product is soluble in water and has rapid curing characteristics. A preferred example of this product is that sold by the American Cyanamid Corporation under the trademark "BEETLE 65".

In the extensive experiments and tests in the development of the present invention, it was discovered that the combined use of the urea-formaldehyde and methylated urea-formaldehyde produced particularly advantageous results as compared to urea-formaldehyde itself, such advantages including rapid cure time as well as the provision of a solidification agent that would thoroughly entrap the liquid radioactive waste within the matrix formed upon the solidification of the urea-formaldehyde and methylated urea-formaldehyde mixture. Although the urea-formaldehyde mixture possesses particularly advantageous properties, the efficiency of the solidification agent is further increased by the addition of urea. As used herein, the term "efficiency" is defined as the weight or volume of the liquid waste per weight or volume of the waste and the solidification agent itself. As is known, urea has the formula $NH_2CONH_2$ and is the diamide of carbonic acid. A typical industrial method of its preparation involves the reaction, under pressure and temperature, of carbon dioxide with ammonia.

A small amount, i.e., on the order of less than about 2.5%, based on the weight of the formulation, of a plasticizer is also employed in the urea-formaldehyde based formulation of the invention. The term "plasticizer" is used herein because the materials employed in this instance are known plasticizers. However, it should be understood at the outset that a remarkable discovery of the invention lies in the fact that the major function of the plasticizer, relative to its use in the composition of the present invention, is not primarily that of a plasticizer. Although this additive serves to reduce any tendency of the solidified mass to be powdery, its main function is that of an antiprecipitant, i.e., it prevents particulate wastes from settling out of the matrix prior to gelling and solidification. The latter serves to keep the solidified mass homogeneous. This can actually be observed and is a remarkable discovery of this invention. The inclusion of the plasticizer further serves to increase the gel time. This significantly improves the homogeneity of the solidified product. A particularly advantageous and preferred plasticizer for use in the present invention comprises a modified polyacrylamide manufactured and sold under the trademark "Cyanamer P-35" by the American Cyanamid Corporation.

It has been found that many radioactive waste materials tend to foam upon addition of the acid-curing agent. Thus, the unique formulation of the invention may include a defoamer which in a preferred embodiment comprises a long-chained surface active agent. As is well known, surfactants, when dissolved in water or water solutions, reduce the interfacial tension between the two liquids or between a liquid solid mixture. Typical categories of surface active agents include nonionic, cationic and anionic materials. Specific examples of such products include the sulfonates of long-chained alcohols prepared by the hydrogenation of fats, sulfonates of succinic esters, alkylaryl sodium sulfonates, sodium β-oleylethanesulfonate, non-silicone surface active agents which contain nonionizing hydrophilic groups such as those prepared by esterifying polyglycerol with a fatty acid, and the like. A particularly advantageous and preferred surfactant for use in the present invention comprises an organic, foam-control agent manufactured and sold under the trademark "Bubble Breaker 748" by the Witco Chemical Corporation.

In preparing the solidification formulation of the invention, the urea-formaldehyde and methylated urea-formaldehyde are first intimately mixed to form a homogeneous blend of the two ingredients. Thereafter, commercial-grade granulated urea, which has been preferably milled to a fine particle size, is added to the methylated urea-formaldehyde mixture. It is preferred at this stage to continuously agitate the mass after the urea has been added so that the latter is thoroughly distributed throughout the mass. Thereafter, the plasticizer and defoamer, if the latter is employed, are added to the mixture. It has been found that the addition of the plasticizer, as well as the surfactant (or defoamer) are best added to the mix in the form of a liquid. Upon the completion of the addition of all the ingredients, the formulation is allowed to cure.

The proportions or weight percentages of the various ingredients of the composition are significant and critical, in order to obtain a product having the desired properties. Thus, the formulation, based on percentage by weight of the total weight of the formulation, should comprise from between about 30-48% by weight urea-formaldehyde; 25-45% by weight methylated urea-formaldehyde; from between about 15-30% by weight urea; from between about 0.1-2.5% by weight, plasticizer and from between 0 to 2% by weight defoamer. As to the latter, it has been found that with certain types of radioactive waste, foaming is not a serious problem, thus in such cases the defoamer may be omitted, or employed in very small amounts.

A preferred and particularly advantageous formulation comprises from between about 31.2% to 46.3% by weight, urea-formaldehyde; from between about 28.5% to 43.5% by weight, methylated urea-formaldehyde; from between about 19 to 28% by weight urea; from between about 0.4% to 2.4% by weight plasticizer and from between about 0 to 2% by weight defoamer.

Although the method steps employed for preparing the solidification agent are not necessarily limiting, both the urea-formaldehyde and methylated urea-formaldehyde should be first thoroughly mixed or blended prior to the addition of the solid urea. The apparatus or equipment used to form the desired homogeneous mixture of the various ingredients are those which are conventionally known and used in the chemical industry.

As previously discussed, the present invention is designed and is uniquely adapted for solidifying radioactive waste materials produced from known sources, i.e., nuclear power plants. In accordance with known technology, the radioactive waste materials may be initially pretreated to adjust the solids content thereof, adjust its pH, or the like. Thereafter, the pretreated radioactive waste, in the form of a liquid or slurry, is mixed with the polymeric formulation of the invention. In a preferred process embodiment, and with reference now to FIG. 1, the radioactive waste may be initially pretreated in a tank or vessel indicated at 1 and then passed to a radioactive waste storage or hold tank 2. As briefly noted hereinabove, the solids content of the waste may be adjusted in the pretreatment tank, as for example by the addition and mixing of liquid waste with dewatered waste. The polymeric formulation is stored in a polymeric storage or hold tank 3. Following any necessary pretreatment of the waste, the waste and polymeric formulation are continuously mixed in a mixing vessel indicated at 4. It may be noted that the mixing vessel 4 is upstream, or separate from, the radioactive disposable container indicated at 6. As shown in FIG. 1, an acidic catalytic-curing agent is mixed with the polymeric-radioactive waste mixture prior to the latter being introduced into the disposable container 6. The time required for solidification within the disposable container 6 is a function of the chemical characteristics of the radioactive waste and the amount of catalyst used. For example, solidification can take place very rapidly, i.e., on the order of a matter of seconds depending upon the mixing ratios. This is not generally preferred because solidification could take place in the mixing equipment pipe lines, conduits or the like. However, the ability to control this variable in accordance with the present invention is significant. The proportions of the waste to that of the polymeric formulation should be on the order of from between about 100 parts by weight waste to from about 40 to 120 preferably 60 to 100 parts by weight polymeric formulation. In this regard, the precise catalyst used may also affect the time required for solidification. In this regard, it has been found that particularly advantageous results are obtained if the acidic catalytic curing agent comprises a strong mineral acid catalyst selected from the group consisting of sulfuric acid and hydrochloric acid. It should be, of course, understood however that other acid catalyst or acidic materials may be employed. Such other materials may typically comprise catalytic curing materials that have been specifically formulated for the curing of resins or polymers. An example of the latter comprises that product sold and manufactured under the trademark "Catalyst 4040" by the American Cyanamid Corporation. However, in view of their ready availlbility and low cost, strong mineral acids are preferred with sulfuric acid being particularly advantageous and comprising the preferred curing agent of the invention.

While the particular apparatus employed to carry out the method of the invention do not form a part thereof, it should be readily appreciated by those skilled in the art that the apparatus which is schematically illustrated in FIG. 1 is particularly adapted for both batchwise and continuous mixing of the various ingredients and is also such that it may include or incorporate automatic control valves, metering devices and the like so as to reduce any hazards associated with the nature of the waste to an absolute minimum. While not shown in FIG. 1, the apparatus may further include flush control means wherein plant service water is automatically introduced into the components and/or process piping exposed to radioactive waste process streams. Further, the polymeric material may be stored in two or more tanks to ensure that the radioactive waste packaging capability would not be impaired in case of a malfunction of a single storage vessel or tank.

The following examples will serve to further illustrate preferred method and composition embodiments of the present invention and include data which clearly establish the effectiveness of the urea-formaldehyde based polymeric formulation as a solidification agent for radioactive waste material.

EXAMPLE 1

As a control, 120 grams of a simulated waste, i.e., water was introduced into a one liter disposable beaker. 100 milliliters of a polymeric formulation of the composition shown in Table 1 was continuously introduced into the beaker with agitation until a substantially homogeneous mixture was formed. Thereafter 10 milliliters of 6 N $H_2SO_4$ was added to the beaker and mixed well, then the mixture was allowed to stand. In three minutes a solid dry, hard body having no free liquid was formed.

TABLE 1

| Polymeric Formulation* | Weight Percent |
|---|---|
| Methylated urea-formaldehyde | 36.586 |
| Urea formaldehyde | 37.885 |
| Urea | 24.169 |
| Defoamer | 0.529 |
| Plasticizer | 0.831 |

*Prepared by forming a mixture of the methylated urea-formaldehyde and urea-formaldehyde and thereafter adding urea which had been ground to a fine particle size. This mixture was stirred for five minutes. The plasticizer (Cyanamer ®P-35) and a defoamer (Bubble Breaker ®748) were then added. The mixture was cured for several days with occasional stirring.

EXAMPLE 2

The procedure of Example 1 was repeated except that the defoamer was omitted from the polymeric composition. The results were substantially the same as that of Example 1. The general procedure of Example 1 was again repeated except that a 50 weight percent slurry comprising bead resin (expended ion-exchange resin) was employed for the water. No foaming occurred with the results again being substantially the same.

EXAMPLE 3

The procedure of Example 1 was repeated except that the amount of urea employed in the polymeric formulation was varied. In a series of tests the amount of the urea was varied between 15 to 30%, by weight, urea based on the total weight of the polymeric formulation. The results were substantially the same as in Examples 1 and 2. In further tests, the amount of urea employed was 8%, 12%, 34% and 38%, by weight, based on the total amount of the composition. In these tests, it was found that upon solidification, a small amount of a mushlike formation was present on the bottom and side edges of the flask. The efficiency, as defined by the volume of the liquid waste per volume of total solids (combined polymer plus waste), was sharply reduced where urea, in an amount outside the percentages of from 15 to 30%, by weight, was employed.

In a series of further tests, the amounts of the methylated urea-formaldehyde and the urea-formaldehyde employed in this formulation were varied. In these tests, it was established that it was necessary to maintain the proportions of these two ingredients within the range of from 25 to 45%, by weight, methylated urea-formaldehyde, and from 30 to 48%, by weight, urea-formaldehyde to obtain a dry, hard product and to have a efficiency greater than about 45%.

EXAMPLE 4

The procedure of Example 1 was repeated except that the plasticizer was omitted from the polymeric formulation. It was found that the solidified mass was slightly powdery and substantially less rigid and elastic than that of Example 1. However, the gel time was found to be longer and on the order of about 10 minutes.

EXAMPLE 5

The procedure of Example 1 was repeated except that para-tolunesulfonic acid and an acidic catalytic material sold under the trademark "CATALYST 4040" by the American Cyanamid Corporation were, in separate tests, substituted for the $H_2SO_4$. The results were substantially the same. "CATALYST 4040" ® is a catalyst formulated for thermosetting resins.

EXAMPLE 6

The procedures of Examples 1–5 were repeated except that small quantities of cesium 137 and strontium 85 were, in separate tests, added to the water used as the control. The test results were substantially the same as Examples 1–5. In further tests, it was demonstrated that a formulation including urea-formaldehyde, methylated ureaformaldehyde and urea provide a blend that on the addition of an acidic catalyst will polymerize to give a hard dry product for radioactive waste materials of substantially all types, from different plants, and the like. The addition of various plasticizers produced improvements in the rigidity and elasticity of the solidified mass, and also produced significant improvements in geltime, and homogeneity of the solidified product. The defoaming agent was required for many waste materials, the foaming problem occurring principally after the addition of the acid catalyst.

EXAMPLE 7

The procedures of Examples 1–5 were repeated using simulated waste types representative of actual waste generated at a nuclear power station. The results were substantially the same as in Examples 1–5. The waste used in those tests comprised the 11 chemical formulations set forth in pages 31–33 of the publication entitled, *"Properties of Radioactive Waste and Waste Containers"*, P. Colombo and R. M. Neilson, Jr.; Prouss Technology Division, Department of Applied Science, Brookhaven National Laboratory Associated Universities, Inc., Upton, N.Y., 11973 (Apr.–June, 1976).

EXAMPLE 8

The procedure of Example 1 was repeated in field tests using radioactive waste at a nuclear power station. The results were substantially the same as Example 1.

While particularly advantageous composition and method embodiments have been disclosed, it should be expressly understood that such embodiments are not to be considered as limiting and that various modifications and changes may be made without department from the generic concept of the invention as defined in the appended claims.

What is claimed is:

1. A composition for forming homogeneous mixtures with radioactive waste materials which, when solidified, forms a solid rigid matrix which entraps said radioactive waste, said composition comprising from between about 30 to 48%, by weight, urea-formaldehyde, from between about 25 to 45%, by weight, methylated urea-formaldehyde; from between about 15 to 30%, by weight, urea and from between about 0.1 to 2.5%, by weight, plasticizer.

2. The composition in accordance with claim 1 and further comprising a defoamer, said defoamer being present in the amount not greater than about 2.0%, by weight.

3. The composition in accordance with claim 2 wherein said defoamer comprises a non-silicone non-ionic surface active agent.

4. The composition in accordance with claim 1 wherein said urea-formaldehyde comprises an unmodified urea-formaldehyde-water solution containing from between about 60 to 70% per weight solids.

5. The composition in accordance with claim 1 wherein said methylated urea-formaldehyde contains at least 60 percent methylated urea-formaldehyde.

6. The composition in accordance with claim 1 comprising from between about 31.0% to 46.0%, by weight, urea-formaldehyde; from between about 28.5% to 43.5%, by weight, methylated urea-formaldehyde; from between about 19% to 28%, by weight, urea; from between about 0.4% to 2.4%, by weight, plasticizer, and from between about 0 to 2%, by weight, defoamer.

7. The composition in accordance with claim 1 wherein said plasticizer comprises a modified polyacrylamide.

8. A process for converting radioactive waste materials into a free-standing solid form, said process comprising the steps of forming a homogeneous mixture of a liquid radioactive waste material with a polymeric composition comprising from about 30 to 48%, by weight, urea-formaldehyde; from between about 25 to 45%, by weight, methylated urea-formaldehyde; from between about 15 to 30%, by weight, urea and from between about 0.1 to 2.5%, by weight, plasticizer; contacting said mixture of said waste and polymeric composition with an acidic catalyzing agent to thereby solidify said mixture and to form a free-standing solid matrix of said polymeric composition which totally entraps said radioactive waste.

9. The process in accordance with claim 8 wherein the ratio of said radioactive waste and said polymeric composition comprises from between about 100 parts, by weight, waste and from between about 40–120 parts, by weight, of said composition.

10. The process in accordance with claim 8 and further comprising transferring the radioactive waste polymeric composition mixture, following the addition of said curing agent, to a storage and shipping container.

11. The process in accordance with the claim 10 wherein said shipping container comprises a disposal container.

12. The process in accordance with claim 8 wherein said acidic catalyzing agent comprises sulfuric acid.

13. The process in accordance with claim 8 wherein said homogeneous mixture comprises 100 parts, by weight, waste and from between about 60 to 100 parts, by weight, of said polymeric composition.

* * * * *